United States Patent
Patel et al.

(10) Patent No.: US 12,117,935 B2
(45) Date of Patent: Oct. 15, 2024

(54) TECHNIQUE TO ENABLE SIMULTANEOUS USE OF ON-DIE SRAM AS CACHE AND MEMORY

(71) Applicant: Advanced Micro Devices, Inc., Santa Clara, CA (US)

(72) Inventors: Chintan S. Patel, Santa Clara, CA (US); Vydhyanathan Kalyanasundharam, Santa Clara, CA (US); Benjamin Tsien, Santa Clara, CA (US); Alexander J. Branover, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/852,300

(22) Filed: Jun. 28, 2022

(65) Prior Publication Data

US 2023/0418745 A1 Dec. 28, 2023

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC .. G06F 13/00; G06F 12/0802; G06F 2212/60; H10B 10/00; H10B 12/00
USPC .......................................................... 711/133
See application file for complete search history.

(56) References Cited

U.S. PATENT DOCUMENTS

| | | |
|---|---|---|
| 2009/0077320 A1 | 3/2009 | Hoover et al. |
| 2012/0278557 A1 | 11/2012 | Wang et al. |
| 2013/0238859 A1 | 9/2013 | Han |
| 2015/0178204 A1* | 6/2015 | Ray ...................... G06F 15/781 711/103 |
| 2016/0203080 A1 | 7/2016 | Bert et al. |
| 2016/0283392 A1* | 9/2016 | Greenfield ............ G06F 12/128 |
| 2018/0095895 A1* | 4/2018 | Pugsley ................ G06F 12/126 |
| 2021/0026686 A1 | 1/2021 | Sakharshete et al. |

OTHER PUBLICATIONS

Sparsh Mittal; A survey of Cache Bypassing Techniques; Apr. 28, 2016; Apr. 28, 2016.*

* cited by examiner

*Primary Examiner* — Mardochee Chery
(74) *Attorney, Agent, or Firm* — Volpe Koenig

(57) ABSTRACT

A technique for operating a cache is disclosed. The technique includes utilizing a first portion of a cache in a directly accessed manner; and utilizing a second portion of the cache as a cache.

21 Claims, 6 Drawing Sheets

TECHNIQUE TO ENABLE SIMULTANEOUS USE OF ON-DIE SRAM AS CACHE AND MEMORY

BACKGROUND

Caches improve performance by storing copies of data considered likely to be accessed again in the future into a low latency cache memory. Improvements to cache technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for operating a cache is disclosed. The technique includes utilizing a first portion of a cache in a directly accessed manner; and utilizing a second portion of the cache as a cache.

Figure 1:
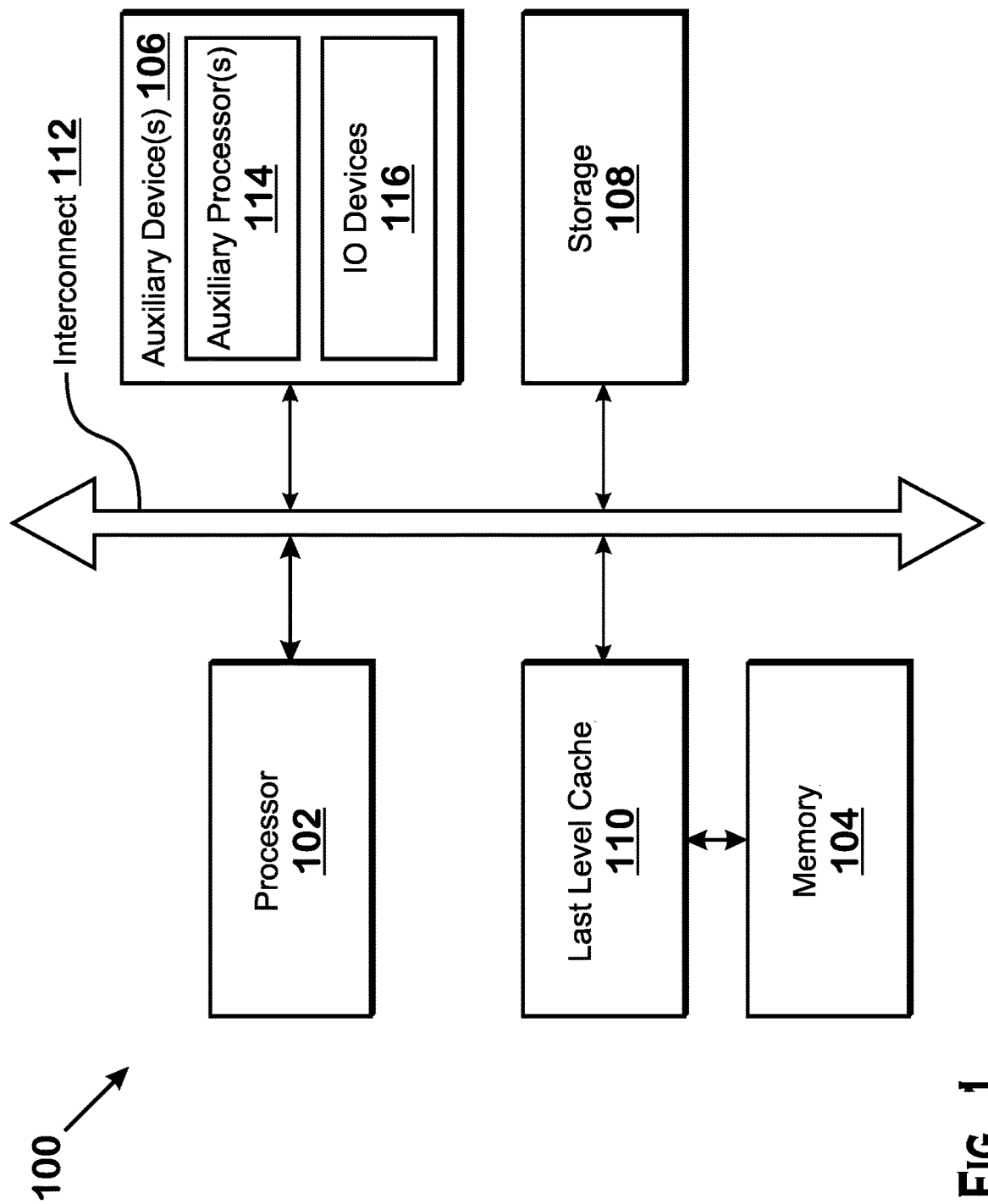
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102 and the various auxiliary devices 106. In some implementations, there other caches within the device 100. For example, in some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches.

In some examples, the last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104. Although techniques are described herein for operations involving the last level cache 100, it should be understood that the techniques can alternatively be used in other types of caches or memories.

Although the last level cache 110 provides benefit to the system by reducing the time required to access data stored in the memory 104 in some instances, additional benefit could be obtained by allowing one or more clients to directly access the last level cache 110. As used herein, the term "client" refers to any element that requests access to the last level cache 110, such as elements of the device 100. In various examples, clients include one or more software elements (e.g., the operating system, a driver, an application, thread, process, or firmware) executing on a processor such as the processor 102, or one or more hardware elements, such as the processor 102 or an auxiliary device 106. A client directly accessing the last level cache means the client explicitly requesting access (e.g., a read or write) to data stored in the last level cache 110. This form of access is contrasted with a different form of access to a cache, referred to as "cache backed access," or "accessing as a cache," in which a client requests data stored in a memory that "backs" a cache. In the cache-backed form of access, a client requests access to data stored in a memory (such as the memory 104), and a cache (e.g., the last level cache 110) for that memory provides access to a copy of the requested data, to improve access latency. In the direct accessed formed of accessing the cache, the data requested is not stored in another memory such as memory 104. Put another way, direct access to data in a cache includes accessing data using an address that is specifically mapped to the cache and is not mapped to a memory that backs that cache.

Figure 2:
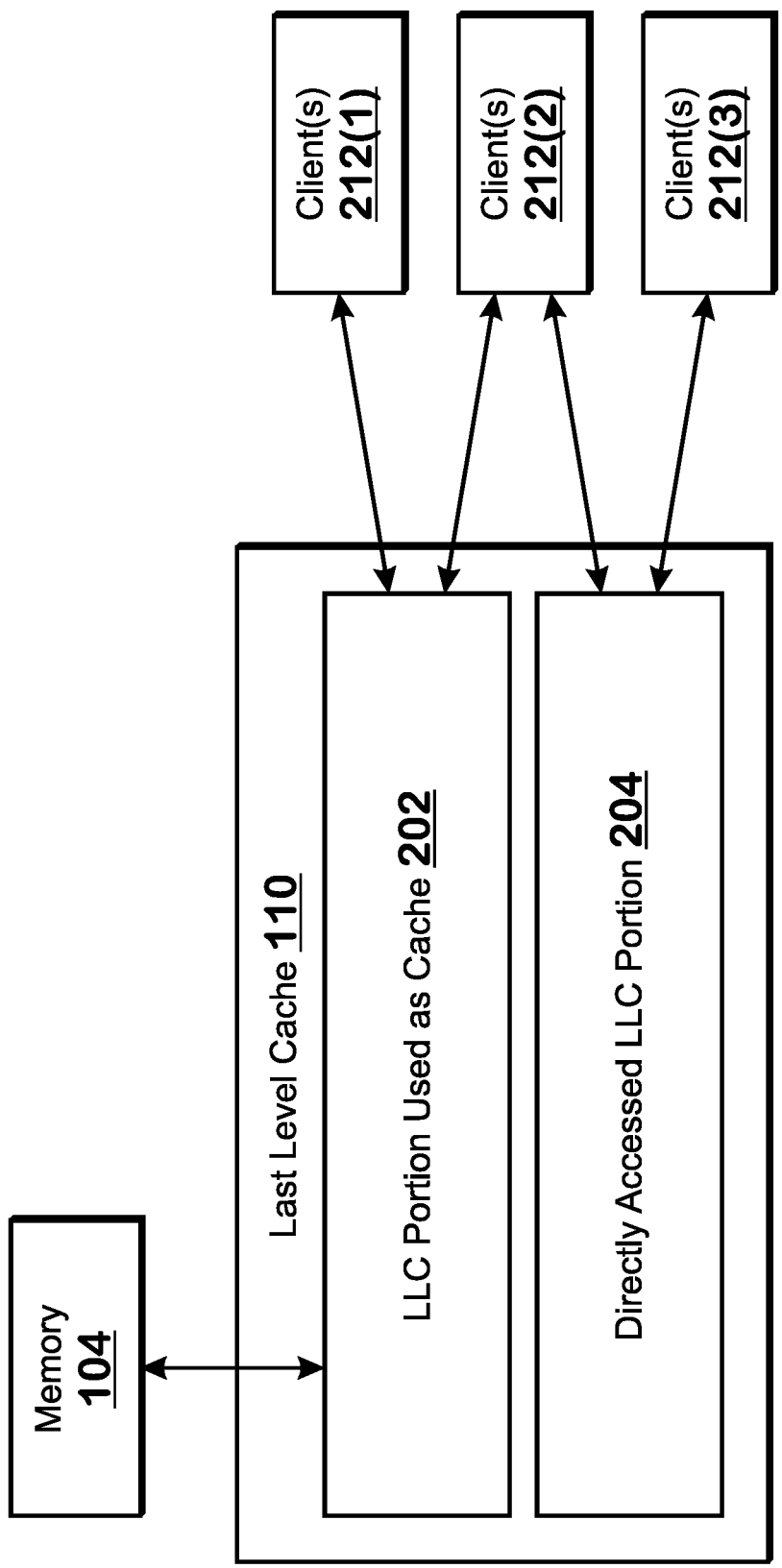
FIG. 2 illustrates operations for a last level cache, according to an example.

FIG. 2 illustrates operations for a last level cache 110, according to an example. As stated elsewhere herein, although techniques are described in the context of a last level cache 110, techniques described herein could be used for caches other than a last level cache 110.

The last level cache 110 includes a portion used as a cache 202 and a portion that is directly accessed 204. In some examples, the portion 202 and portion 204 represent different entries of the last level cache 110. An entry is a portion of the memory banks of the cache 110 and stores some portion of the total data that can be stored in the last level cache 110. In some examples, an entry of the last level cache 110 is sized to store a cache line. It is possible at any point in time for the portion used as a cache 202 to have no entries (i.e., have a size of zero, thus the cache 110 is only used in directly accessed mode) or for the directly accessed portion 204 to have no entries (i.e., have a size of zero, thus the cache 110 is only used in directly accessed mode).

The device 100 is capable of converting entries of the last level cache 110 from being used as cache to being used in a directly accessed manner. In some examples, this conversion is done at the request of the client 212 that is to use the cache in the directly accessed manner. In other words, a client makes a determination to use a portion of the cache 110 in a directly address manner, requests conversion of a portion of the cache 110 in a directly accessed manner, and then, after the conversion, uses that portion in a directly accessed manner. In other examples, the conversion is done by an entity other than the entity that uses the cache in the directly accessed manner. In an example, a software entity, such as a driver being executed by the processor 102, detects activation (e.g., power-on or increased activity) of an auxiliary device 106. In response, the software entity causes a portion of the last level cache 110 to be converted for use in a directly accessed manner. The auxiliary device 106 then uses the portion of the cache in a directly accessed manner. In some examples, the software entity such as the driver stores or has access to data that indicates which auxiliary devices 106 are to use the last level cache 110 in a directly accessed manner. In response to activation of those auxiliary devices 106, the software entity detects such activation and causes a portion of the last level cache 110 to be converted to directly accessed. In some examples, the software entity detects that a software unit (e.g., process or application) begins execution, detects that the software unit is of a type that uses the cache in a directly accessed manner, and causes a portion of the last level cache 100 to be used in a directly accessed manner. In sum, a software entity is able to detect a change in conditions in the device 100 that requires at least a portion of the last level cache 110 operating in the directly accessed mode. In response, the software entity converts at least a portion of the last level cache 110 to the directly accessed mode.

The device is also capable of converting a portion of the cache used in a directly address manner to a portion used as a cache. In examples, a reversal of the action that cause a portion to be converted to use in a directly address manner causes that portion to be converted back to being used as a cache. In examples where the device converts a portion of the cache due to a software unit executing or auxiliary device 106 being powered up, the device converts that portion back to use as a cache when the software unit finishes execution or when the auxiliary device 106 is powered down. In some examples, an entity such as a software unit or hardware unit explicitly requests a portion of the last level cache 110 already used by that software or hardware unit in a directly accessed mode to be converted back to being used as a cache, and the last level cache 110 performs such conversion.

In various examples, the entity that controls which portions of the last level cache 110 are used as a cache and which portions are directly accessed is a hardware or software element, such as a driver executing on the processor 102 or a cache controller or memory manager.

In some examples, the direct addressing is implemented via a memory mapping mechanism. Specifically, for portions that are directly accessed 204, the client 212 access those portions via a set of memory addresses. A memory mapper, which can be a hardware or software mechanism, accesses mapping information that maps the set of memory addresses to entries within the cache 110. Thus, accesses to those portions by the set of memory addresses result in access to the corresponding entries in the cache 110. In some examples, the set of memory addresses assigned to a client and directly mapped to the cache 110 is referred to herein as an aperture. In some examples, different clients 212 are assigned different apertures, so that the different clients are unable to access each other's directly mapped portions of the cache 110.

FIG. 2 illustrates client(s) 212(1) that access the LLC portion used as cache 202, and do not access the directly accessed LLC portion 204, client(s) 212(2) that access the LLC portion used as cache 202 and the directly accessed LLC portion 204, client(s) 212(3) that access the directly accessed LLC portion 204 and not the LLC portion used as cache 202. It is possible at any given point in time for a device 100 to include any combination of these types of clients 212.

Figure 3:
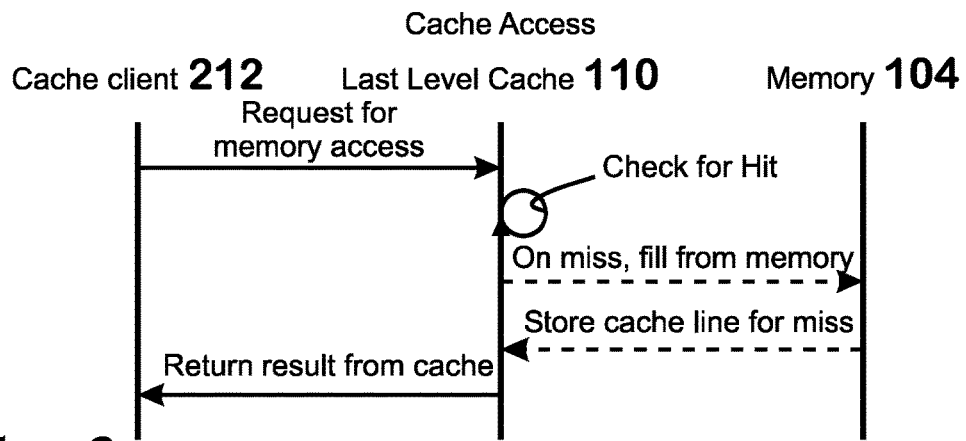
FIG. 3 illustrates operations for accessing the portion of the last level cache used as a cache, according to an example.

FIG. 3 illustrates operations for accessing the portion of the last level cache 110 used as a cache 202, according to an example. A cache client 212 transmits a request to access data to the last level cache 110. The request includes a memory address. The memory address is directed to a part of the memory address space that is not directly mapped to the cache 110, but for which data is stored in the memory 104. A memory address space is a set of addresses that can be addressed by a memory address. For the portion of the cache 110 involved in the memory access request illustrated in FIG. 3, the cache 110 is capable of "caching" the data that is stored in the memory 104. Thus, in response to the memory access request, the cache 110 checks whether the cache 110 stores the requested data (whether a "hit" occurs). In the event that a miss occurs (a hit does not occur), the cache 110 fetches the data from the memory 104 and stores the cache line in the cache 110. In the event that a hit occurs, the cache 110 does not fetch the data. The cache 110 responds to the request from the client 212 with the requested data.

Figure 4:
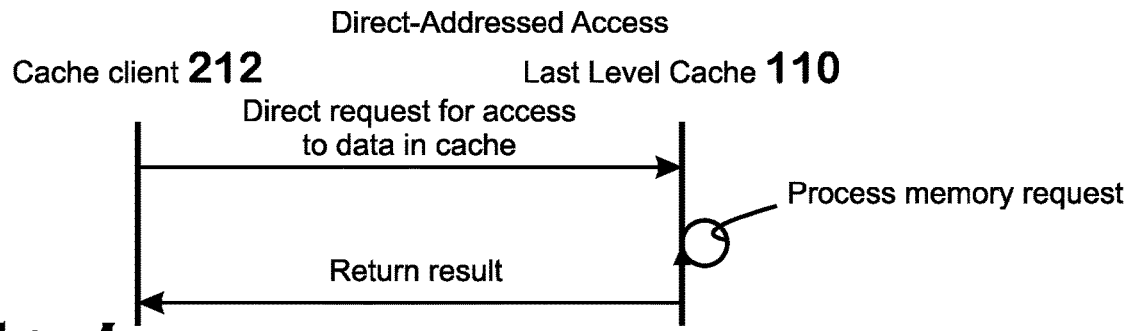
FIG. 4 illustrates operations for accessing the portion of the last level cache used in a directly accessed manner, according to an example.

FIG. 4 illustrates operations for accessing the portion of the last level cache 110 used in a directly accessed manner, according to an example. A cache client 212 transmits a request to access data to the last level cache 110. The request includes a memory address, and the memory address is specifically mapped to a portion of the last level cache 110 that is directly accessed. Because the memory accessed is specifically mapped to such a portion, the data is stored in the last level cache 110. Thus the last level cache 110 processes the memory request without communicating with the memory 104 and returns the result.

One difference between the operations in FIGS. 3 and 4 is that in FIG. 3, the portion of the last level cache that is discussed is "memory backed." In other words, this portion of the last level cache 110 stores a copy of data in the memory 104. By contrast, the portion of the last level cache 110 involved in FIG. 4 is not backed by memory. The data stored in the last level cache 110 is not a copy of data in memory 104. Further, the last level cache 110 does not perform cache activities such as flushing data, writing back data, or other related operations for the data in the portion that is directly-mapped.

Figure 5:
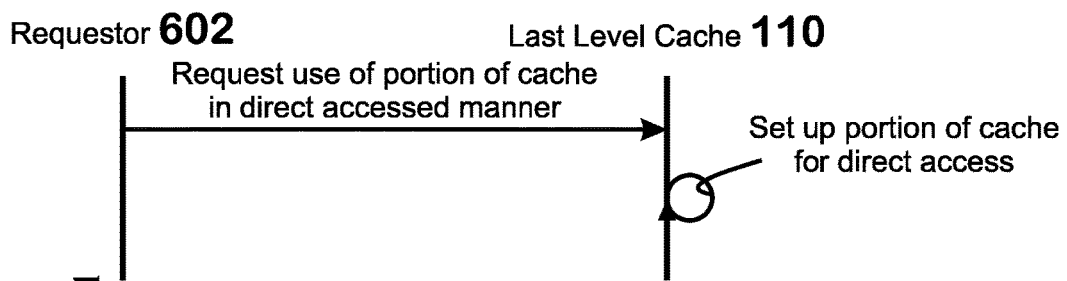
FIG. 5 illustrates operations related to converting at least a portion of the last level cache to be used in a directly accessed manner, according to an example.

FIG. 5 illustrates operations related to converting at least a portion of the last level cache 110 to be used in a directly accessed manner, according to an example. A requestor 602, such as a client 212, a driver, or other hardware or software of the device 100, requests to convert at least the portion of the last level cache 110 to be used in a directly accessed manner. In response, the portion of the last level cache 110 converts to be used in a directly accessed manner.

In some examples, the request of FIG. 5 is made to an entity other than the last level cache 110, such as a portion of a memory system (such as a memory controller). In an example, in response to the request, and in order to convert the portion of the cache 110 for use in a directly accessed manner, a memory controller sets at least a part of a memory mapping that indicates how at least some memory addresses are mapped to the last level cache 110. This setting causes certain memory addresses to be mapped to the portion of the cache to be accessed in a directly accessed manner. The certain memory addresses are memory addresses used by a client 212 for accessing the last level cache 110.

Figure 6:
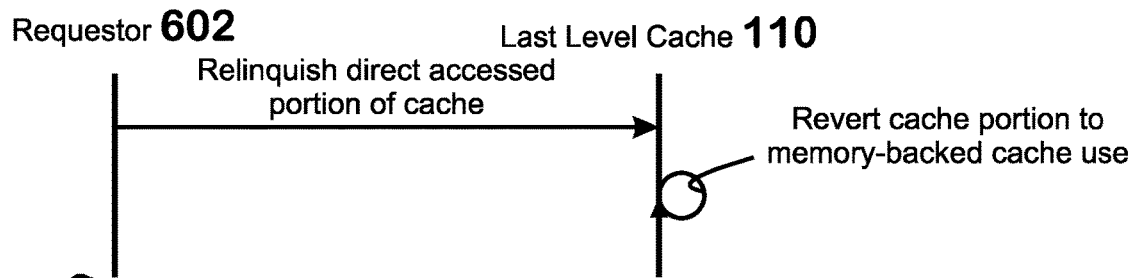
FIG. 6 illustrates operations related to converting at least a portion of the last level cache from being used in a directly accessed manner to being used as a cache, according to an example.

FIG. 6 illustrates operations related to converting at least a portion of the last level cache 110 from being used in a directly accessed manner to being used as a cache, according to an example. A requestor 602 requests to relinquish the portion of the last level cache 110 being used in a directly accessed manner. In response, the portion of the last level cache 110 is reverted to being used as a cache.

As with in FIG. 5, in some examples, the request of FIG. 6 is made to an entity other than the last level cache 110, such as a memory controller. In such examples, in response to the request, the memory controller removes the mapping for the memory addresses that previously were mapped to the directly accessed portion of the cache. After this removal, the memory addresses no longer point to the cache 110, and the portion of the cache that was used in a directly accessed manner is used as a cache.

In some examples, the cache 110 is a set-associative cache. Such a cache includes a plurality of sets, each having a plurality of ways. In an example, a four-way associative cache has four ways per set. In addition, in such a cache, a particular way refers to the same way in each set. For example, a way having index 0 refers to the $0^{th}$ way of each set. In some examples, each portion that is assigned for use either in a directly accessed manner or as a cache is defined by one or more ways of the cache or one or more sets of the cache. In other words, in some examples, a particular group of ways, including all entries of those ways, are assigned for use as a cache, and a different group of ways are assigned for use in a directly accessed manner. In other examples, different sets, and not different ways, are assigned for use as a cache or in a directly accessed manner. In yet other examples, it is possible for the mode of usage (i.e., use as a cache or in a directly accessed manner) to be specified on an entry by entry basis, meaning that individual, neighboring entries can be in different modes of usage.

In some examples, the cache 110 itself includes information indicating which entries, sets, ways, or other subdivisions of the cache 110 are used in which mode.

In FIGS. 3-6, the cache clients 212 are any of the clients described elsewhere herein, such as a software or hardware entity of the device 100.

Figure 7:
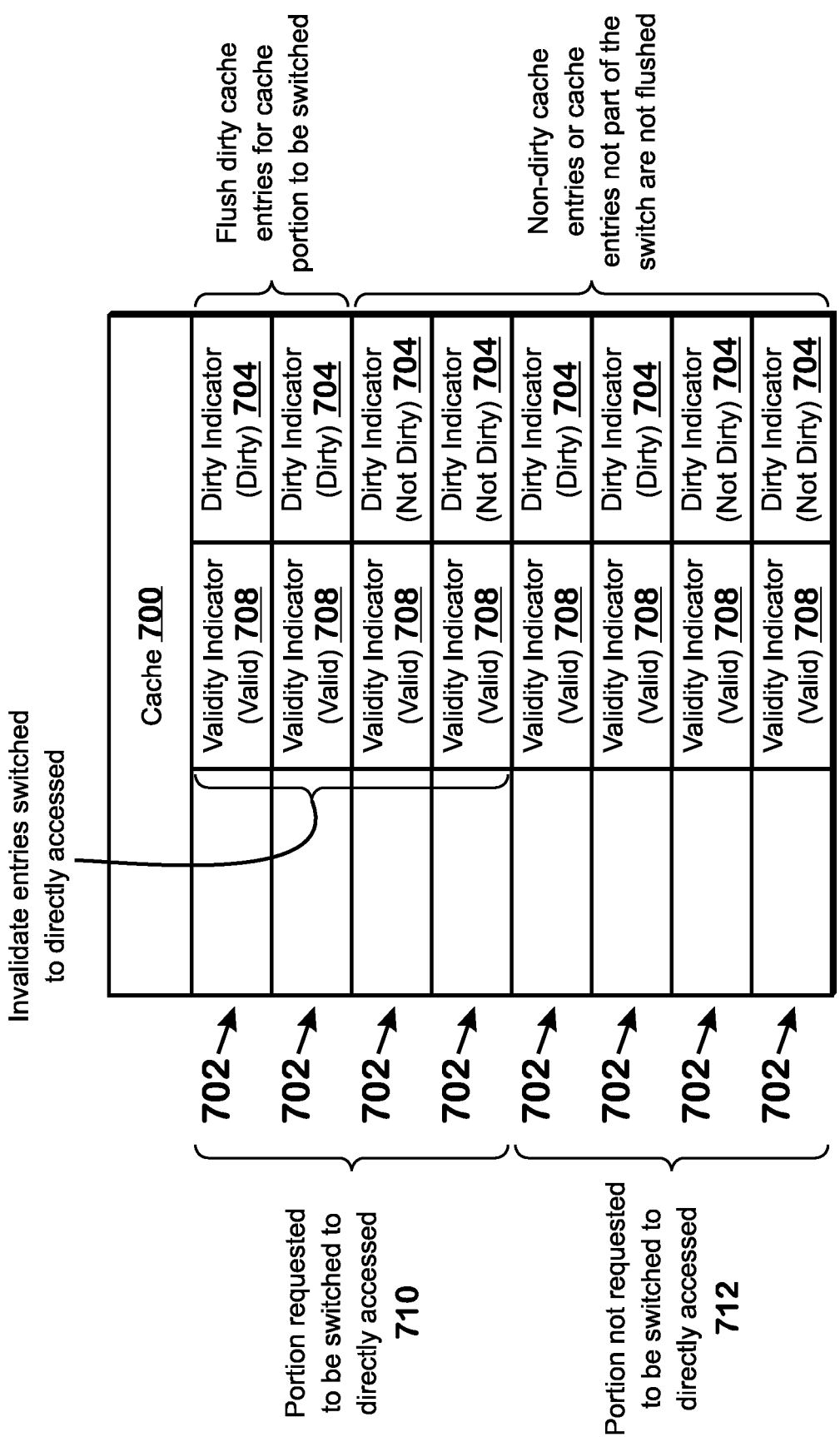
FIG. 7 illustrates operations related to converting some cache entries from being used as a cache to being used in a directly accessed manner, according to an example.

FIG. 7 illustrates operations related to converting some cache entries 702 from being used in as a cache to being used in a directly accessed manner, according to an example. The operations of FIG. 7 occur in response to a request to convert a portion of the cache 700 from being used as a cache to being used in a directly accessed manner. The cache 700 includes a number of cache entries 702, each of which includes a validity indicator 708, and a dirty indicator 704, which indicates either that the cache entry 702 is dirty or not dirty. For cache entries 702 that are used as a cache, the validity indicator 708 indicates whether such cache entry 702 includes valid data. If such a cache entry 702 is indicated as not valid, then a request will not hit on that cache entry 702 and if a cache entry 702 is indicated as valid, then a request can hit on that cache entry 702 assuming all other requirements for a hit are satisfied (e.g., the memory address for the request indicates the way and set of the cache entry 702). In some implementations, cache entries 702 that are used in a directly accessed manner have validity indicators 708 that indicate that the cache entries 702 are invalid. This occurs so that restoring those cache entries 702 to use as a cache is relatively simple, as described in further detail below.

The cache 700 includes a portion 710 requested to be switched to being directly accessed, and a portion 712 that is not requested to be switched to being directly accessed. Within the portion 710 requested to be switched to being directly accessed, two cache entries 702 are indicated as being dirty and two cache entries 702 indicated as being not dirty. For the cache entries 702 indicated as being dirty, converting those cache entries 702 to being used in a directly accessed manner includes flushing those cache entries 702 to the backing store such as memory 104. Flushing those cache entries 702 includes writing the data of those cache entries 702 back to the memory 104. Non-dirty cache entries 702 and cache entries 702 that are not being converted to being used in a directly accessed manner are not flushed to the memory 104. All cache entries 702 that are being converted to being used in a directly accessed manner are invalidated (validity indicators 708 are set to invalid). In some examples, all cache entries 702 that are used in a directly accessed manner have validity indicators 708 set to invalid.

Figure 8:
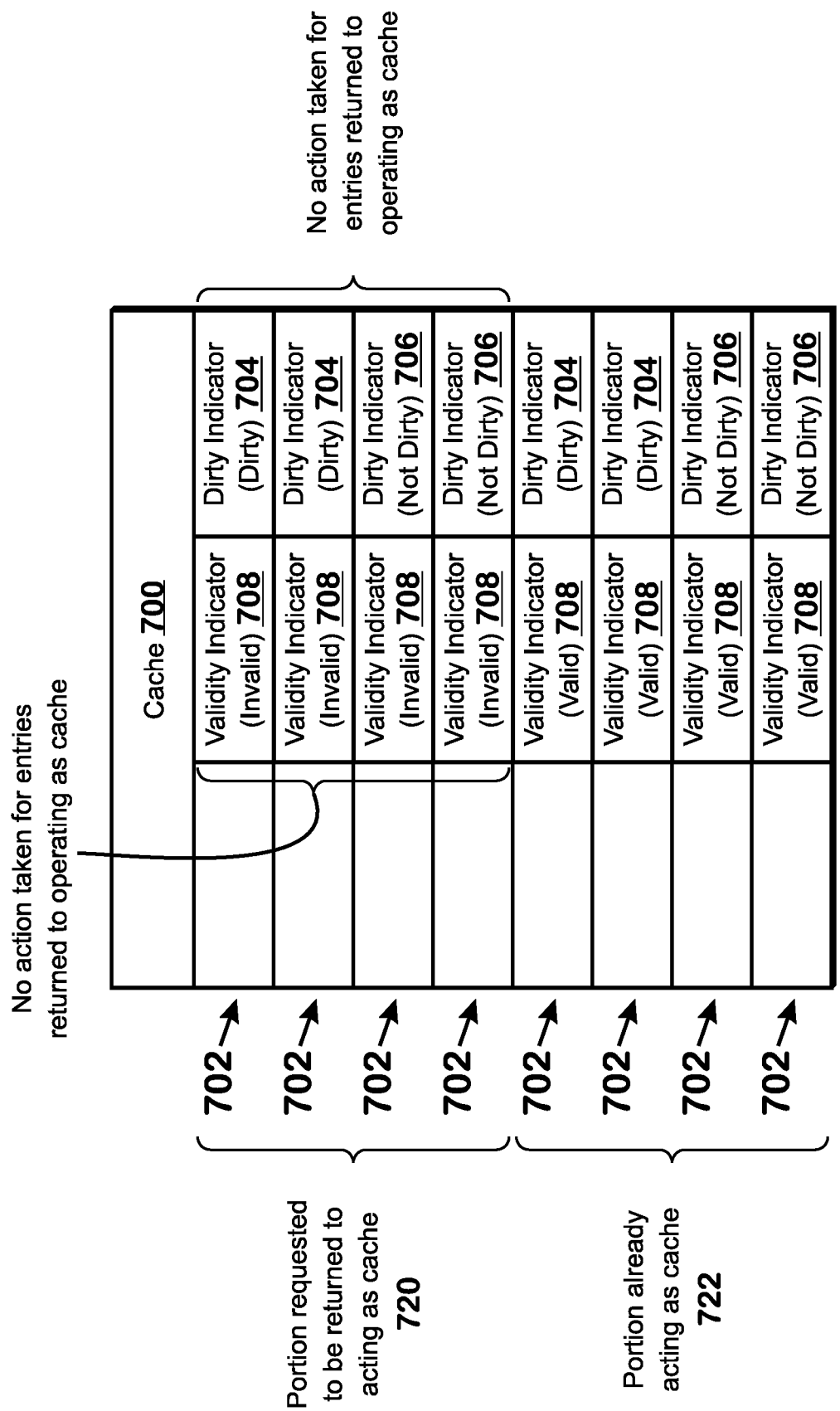
FIG. 8 illustrates operations for returning cache entries from being used in a directly accessed manner to acting as a cache, according to an example.

FIG. 8 illustrates operations for returning cache entries 702 from being used in a directly accessed manner to acting as a cache, according to an example. Portion 720 is acting in a directly accessed manner and is requested to be returned to acting as a cache, and portion 722 is already acting as a cache. Because the cache entries requested to be returned to being directly accessed are already invalid, no action is taken with respect to the validity indicators 708 of those entries. Because these entries are invalid, the cache 700 is able to simply resume using these entries 702 as a cache, storing new data into these entries without evicting any cache lines when a miss occurs. In other words, when the cache entries are returned to being used as a cache, the cache entries can simply be used as normal. Such use includes placing new data into these cache entries in response to a miss occurring. Because the cache entries are marked as invalid, fetched data can simply be stored into those entries.

For the techniques illustrated in FIGS. 7 and 8, changing which mode (e.g., as a cache or directly accessed) cache entries 702 are used in includes modifying a data structure that indicates which cache lines are in which mode. In an example, such techniques include, in response to converting a cache entry 702 to directly accessed, modifying the data structure to indicate that the cache entry 702 is directly accessed. In another example, such techniques include, in response to converting a cache entry 702 to acting as a cache, modifying the data structure to indicate that the cache entry 702 is used as a cache.

In various examples, a software or hardware entity performs some or all of the actions described with respect to FIGS. 7 and 8. In some examples, the entity is a driver, a part of an operating system, or another software entity executing on a processor. In other examples, the entity is a memory controller, which is a circuit, or other hardware circuit. In yet other examples, the entity is a combination of software and hardware. In some examples, the cache 700 of FIGS. 7 and 8 is the last level cache 110.

Figure 9:
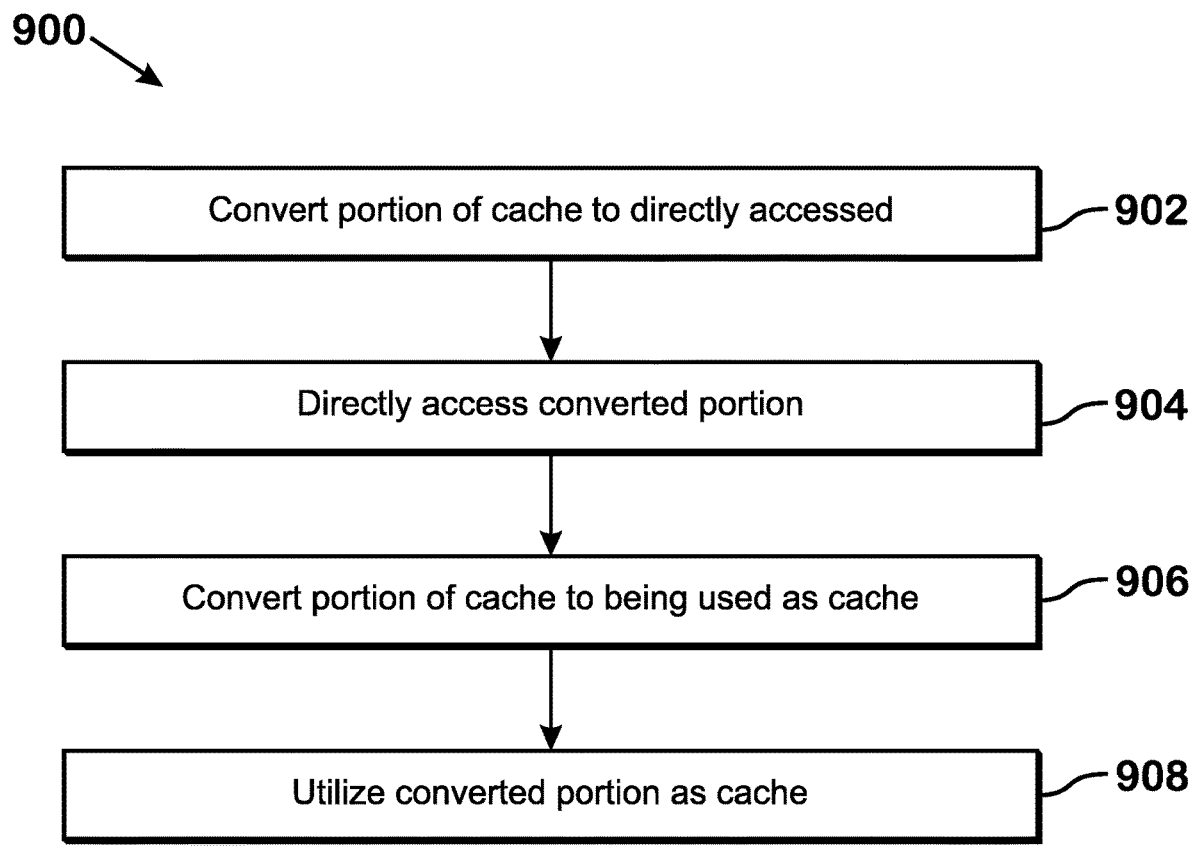
FIG. 9 is a flow diagram of a method for operating a cache, according to an example.

FIG. 9 is a flow diagram of a method 900 for operating a cache, according to an example. Although described with respect to the systems of FIGS. 1-8, those of skill in the art will understand that any system that performs the steps of the method 900 in any technically feasible order falls within the scope of the present disclosure.

At step 902, the device 100 converts at least a portion of a cache 110 to being directly accessed. In some examples, this portion is used as a cache prior to being converted to being directly accessed. As described elsewhere herein, being directly accessed means that the portion is not backed by a memory (e.g., memory 104) and thus that there is no copy in memory 104 of the data in the portion of the cache. Instead, accesses to that portion are serviced by that portion, and no caching mechanisms such as write-backs, cache flushes, or fetching data into the cache in response to a miss are used.

At step 904, the converted portion is directly accessed. Directly accessing that portion includes requesting read or write to that portion of the cache. In some examples, the memory addresses involved in such request are mapped to one or more entries of the cache 110. Thus the access results in access to the mapped entries of the cache 110. Because the portion does not operate as a cache, the cache does not perform "normal" caching operations for that portion. Such normal caching operations include checking for a hit or a miss, fetching the cache line from a backing memory (e.g., memory 104) upon detecting a miss, performing evictions, invalidations, or write-backs, or the like. In addition, because the address is specifically mapped to a portion of the cache 110, a miss cannot actually occur. The address maps to a specific entry within the cache, and the data within that entry is the data targeted by the request.

At step 906, the device 100 converts a portion of the cache 110 from being directly accessed to being used as a cache. As described elsewhere herein, being used as a cache means that the portion is backed by a backing memory, such as memory 104. The portion stores a copy of data in that memory, checks for hits and misses, fetches data into the portion in response to a miss, performs evictions, write-backs, and the like, and maintains cache status data, such as validity data and dirty data. Memory addresses map into this portion according to an associativity scheme, in which each address maps to a particular set that includes a one or more ways (or just one way in a direct-mapped scheme). Because the cache is typically smaller than the backing memory, evictions can occur in the event that there are no available (e.g., invalid) entries in a set when a miss occurs for that set (e.g., when a miss occurs for an address that maps into that set).

At step 908, the device 100 utilizes the converted portion as a cache. Utilizing the converted portion as a cache includes servicing requests for access to memory by checking if an entry stores data requested by the address. This servicing includes determining whether a hit or miss occurs for that request. A hit occurs if the requested data is stored in the cache and a miss occurs if the requested data is not stored in the cache. If a miss occurs, the cache 110 fetches the data from the backing memory (e.g., memory 104). The cache 110 provides the requested data to the client. In the event that a miss occurs and there are no free (e.g., invalid) entries in the set mapped to the request address, the cache 110 evicts a cache entry according to a replacement policy (e.g., least recently used). If an evicted cache entry is dirty, the cache 110 writes the cache back to the backing memory. A cache entry becomes dirty if the cache entry is written to in the cache.

In various examples, the steps of FIG. 9 are performed by a hardware unit, a software unit executing on a processor, or a combination of hardware and software. In some examples, some or all of the steps of FIG. 9 are performed by a cache controller, which is a hardware circuit. In some examples, at least some of the steps of FIG. 9 are performed by a driver executing on a processor such as processor 102. In some examples, steps 902 and 906 are performed by a driver and a cache controller operating in conjunction and steps 904 and 908 are performed by a cache controller.

In some examples, steps 902 and 906 include performing operations on data indicating which entries of the cache 110 are operated as a cache and which are operated in a directly accessed mode. In an example, step 902 includes modifying that data to indicate that the associated entries are operated in a directly accessed mode and step 906 includes modifying the data to indicate that the associated entries are operated as a cache.

The elements in the figures are embodied as, where appropriate, software executing on a processor, a fixed-function processor, a programmable processor, or a combination thereof. The processor 102, last level cache 110, interconnect 112, memory 104, storage 108, various auxiliary devices 106, and client 212 include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a cache, the method comprising:
    utilizing a first portion of the cache as a cache; and
    reconfiguring a first sub-portion of the first portion to be accessed directly, the reconfiguring including invalidating entries of the first sub-portion.

2. The method of claim 1, further comprising:
    prior to utilizing a second portion of the cache in a directly accessed manner, converting the second portion from being used as a cache to being used in the directly accessed manner.

3. The method of claim 2, wherein converting the second portion includes flushing dirty cache entries from the second portion and invalidating entries of the second portion.

4. The method of claim 2, wherein converting the second portion includes recording an indication that entries of the second portion are to be used in a directly accessed manner.

5. The method of claim 1, further comprising:
    prior to utilizing the first portion as the cache, converting the first portion from being used in a directly accessed manner to being used as a cache.

6. The method of claim 1, further comprising utilizing a second portion of the cache in a directly accessed manner, the utilizing including operating the second portion without a backing memory, and utilizing the first portion as a cache includes operating the first portion with a backing memory.

7. The method of claim 1, further comprising utilizing a second portion in a directly accessed manner, the utilizing including consulting a memory mapping that maps an address of a memory access request to an entry of the second portion.

8. The method of claim 1, further comprising utilizing a second portion in a directly accessed manner, the utilizing including consulting a data entry that indicates that entries of the second portion are to be accessed in the directly accessed manner.

9. The method of claim 1, wherein utilizing the first portion as a cache includes consulting a data entry that indicates that entries of the first portion are to be accessed as a cache.

10. A system, comprising:
    a cache; and
    a processor configured to access data stored in the cache,
        wherein the cache is configured such that the accesses from the processor utilize a first portion of the cache as a cache,
    wherein the processor is configured to:
        switch a first sub-portion of the first portion to being used in a directly accessed manner, the switching including invalidating entries of the first sub-portion.

11. The system of claim 10, wherein the cache is configured to, prior to utilizing a second portion of the cache in a directly accessed manner, convert the second portion from being used as a cache to being used in the directly accessed manner.

12. The system of claim 11, wherein converting the second portion includes flushing dirty cache entries from the second portion and invalidating entries of the second portion.

13. The system of claim 11, wherein converting the second portion includes recording an indication that entries of the second portion are to be used in a directly accessed manner.

14. The system of claim 10, wherein prior to utilizing the first portion as the cache, the first portion is converted from being used in a directly accessed manner to being used as a cache.

15. The system of claim 10, wherein the processor is further configured to utilize a second portion of the cache in a directly accessed manner, the utilizing including operating the second portion without a backing memory, and utilizing the first portion as a cache includes operating the first portion with a backing memory.

16. The system of claim 10, wherein the processor is further configured to utilize a second portion in the directly accessed manner, the utilizing including consulting a memory mapping that maps an address of a memory access request to an entry of the second portion.

17. The system of claim 10, wherein the processor is further configured to utilize a second portion in the directly accessed manner, the utilizing including consulting a data entry that indicates that entries of the second portion are to be accessed in the directly accessed manner.

18. The system of claim 10, wherein utilizing the first portion as a cache includes consulting a data entry that indicates that entries of the first portion are to be accessed as a cache.

19. A system, comprising:
    a cache; and
    a plurality of clients configured to access data stored in the cache,
        wherein the cache is configured such that the accesses from the plurality of clients utilize a first portion of the cache as a cache,
    wherein the cache is configured to:

switch a first sub-portion of the first portion to being used in a directly access manner, the switching including invalidating entries of the first sub-portion.

20. The system of claim 19, wherein the cache is configured to, prior to utilizing a second portion in a directly accessed manner, convert the second portion from being used as a cache to being used in the directly accessed manner.

21. The method of claim 1, further comprising:
reverting the first sub-portion back to being used as a cache, the reverting including storing new data into the first sub-portion without performing any evictions.

* * * * *